(12) United States Patent
Wada

(10) Patent No.: US 8,415,815 B2
(45) Date of Patent: Apr. 9, 2013

(54) FLUID MACHINE, RANKINE CIRCUIT, AND SYSTEM FOR UTILIZING WASTE HEAT FROM VEHICLE

(75) Inventor: Hirofumi Wada, Kodama-gun (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 12/597,861

(22) PCT Filed: Apr. 24, 2008

(86) PCT No.: PCT/JP2008/057899
§ 371 (c)(1),
(2), (4) Date: Oct. 27, 2009

(87) PCT Pub. No.: WO2008/139877
PCT Pub. Date: Nov. 20, 2008

(65) Prior Publication Data
US 2010/0090476 A1 Apr. 15, 2010

(30) Foreign Application Priority Data
Apr. 27, 2007 (JP) .................................. 2007-118627

(51) Int. Cl.
*F01K 25/00* (2006.01)
(52) U.S. Cl. .......................................... 290/2; 62/238.6
(58) Field of Classification Search ...... 290/2; 62/238.6, 62/238.4
See application file for complete search history.

(56) References Cited

U.S. PATENT DOCUMENTS

| | | | |
|---|---|---|---|
| 4,471,622 A | | 9/1984 | Kuwahara |
| 7,019,412 B2 * | | 3/2006 | Ruggieri et al. .................. 290/2 |
| 7,260,952 B2 * | | 8/2007 | Takeuchi et al. ............. 62/238.6 |
| 7,347,673 B2 * | | 3/2008 | Yamanouchi et al. ......... 417/237 |
| 7,418,824 B2 * | | 9/2008 | Uno et al. ..................... 62/238.6 |
| 7,458,220 B2 * | | 12/2008 | Iwanami et al. ................ 60/671 |
| 7,836,696 B2 * | | 11/2010 | Uno et al. ........................ 60/670 |
| 2004/0187506 A1 | | 9/2004 | Iwanami et al. |
| 2004/0231331 A1 | | 11/2004 | Iwanami et al. |
| 2005/0235670 A1 * | | 10/2005 | Takeuchi et al. ............. 62/238.6 |
| 2006/0073050 A1 | | 4/2006 | Iwanami et al. |

FOREIGN PATENT DOCUMENTS

| | | |
|---|---|---|
| JP | 58-014404 | 1/1983 |
| JP | 02-045602 | 2/1990 |
| JP | 06-273020 | 9/1994 |
| JP | 8-261579 | 10/1996 |
| JP | 2002-527670 | 8/2002 |
| JP | 2003-035289 | 2/2003 |
| JP | 2004-293310 | 10/2004 |
| JP | 2005-30386 | 2/2005 |
| JP | 2006-087295 | 3/2006 |
| JP | 2006-242049 | 9/2006 |
| JP | 2006-266113 | 10/2006 |
| JP | 2007-009897 | 1/2007 |
| WO | WO 03/069130 | 8/2003 |

* cited by examiner

*Primary Examiner* — Truc Nguyen
(74) *Attorney, Agent, or Firm* — Cozen O'Connor

(57) ABSTRACT

A system for utilizing waste heat from a vehicle has a Rankine circuit, and the Rankine circuit includes a fluid machine. A generating unit of the fluid machine has a third rotating body that is disposed coaxially with a first rotating body of a pump unit and a second rotating body of an expansion unit. The fluid machine has a drive shaft that is integrally connected at least to the first rotating body, among the first, second and third rotating bodies, and a power transmission unit that is connected to the drive shaft and transmits external power to the drive shaft.

27 Claims, 9 Drawing Sheets

FLUID MACHINE, RANKINE CIRCUIT, AND SYSTEM FOR UTILIZING WASTE HEAT FROM VEHICLE

RELATED APPLICATIONS

This is a U.S. National Phase Application under 35 USC §371 of International Application PCT/JP2008/057899 filed on Apr. 24, 2008.

This application claims the priority of Japanese Patent Application No. 2007-118627 filed Apr. 27, 2007, the entire content of which is hereby incorporated by reference.

TECHNICAL FIELD

The present invention relates to a fluid machine, a Rankine circuit, and a system for utilizing waste heat from a vehicle.

BACKGROUND ART

A Rankine circuit constructing a system for utilizing waste heat of an inner combustion engine, such as a vehicle engine, has a circulation path through which a working fluid (heat medium) circulates. A pump, an evaporator (heat exchanger), an expansion machine, and a condenser are interposed in the circulation path in the order named.

The pump is driven, for example, by an electric motor to circulate the working fluid. The working fluid receives waste heat when passing through the evaporator, and is expanded in the expansion machine. In this process, the thermal energy of the working fluid is converted into torque and outputted outside. The thermal energy is thus used, for example, to rotate a fan for air-cooling the condenser.

As a compact and inexpensive fluid machine that is suitable for the Rankine circuit, Unexamined Japanese Patent Publication No. 2005-30386 discloses a fluid machine in which a pump, an expansion machine and a motor have a single drive shaft in common. In the fluid machine, the pump is started by the motor being activated upon receipt of external power. The working fluid circulates in response to the start of the pump, and the working fluid that has received heat energy is expanded in the expansion machine. After the motor is activated, the power supply to the motor is stopped. The pump is operated by the torque outputted from the expansion machine, and the motor is caused to function as a generator.

According to the fluid machine disclosed in Publication No. 2005-30386, since the motor that produces a rotational driving force is equipped with a function of generating electric power, the power generation efficiency of the motor is lower than that of a generator having only the power-generating function.

The fluid machine disclosed in Publication No. 2005-30386 utilizes a DC motor. In general, a DC motor has larger weight than an AC motor, and has lower power generation efficiency when being used as a generator. In addition, the DC motor needs to be maintained by brushing.

Furthermore, according to the fluid machine described in Publication No. 2005-30386, the heat energy recovered by the expansion machine, that is, the torque produced in the expansion machine, is once converted into electric power. The recovered heat energy cannot be outputted to the outside as torque.

DISCLOSURE OF THE INVENTION

It is an object of the invention to provide a compact fluid machine having not only an expansion unit and a pump unit but a generating unit capable of generating power with high efficiency, a Rankine circuit using the fluid machine, and a system for utilizing waste heat from a vehicle.

In order to achieve the object, the invention provides a fluid machine having a pump unit that includes a first rotating body, draws in a working fluid along with rotation of the first rotating body, and pressurizes and then discharges the working fluid that has been drawn in; an expansion unit that includes a second rotating body, receives the working fluid along with rotation of the second rotating body, and expands and then delivers out the working fluid that has been received; a generating unit that includes a third rotating body disposed coaxially with the first and second rotating bodies, and generates electric power along with rotation of the third rotating body; a drive shaft that is integrally connected at least to the first rotating body, among the first, second and third rotating bodies; and a power transmission unit that is connected to the drive shaft and transmits external power to the drive shaft.

In the fluid machine of the invention, the pump unit, the expansion unit, and the first, second and third rotating bodies of the generating unit are coaxially disposed, which makes it possible to downsize the fluid machine.

In this fluid machine, the drive shaft and the first rotating body of the pump unit are at least integrally connected to each other, and the power transmission unit that transmits the external power is connected to the drive shaft. The pump unit can therefore be started by using the external power. Accordingly, the generating unit is not required to function as an electric motor. For that reason, in this fluid machine, the generating unit is constructed to achieve high power generation efficiency, and therefore generates power with high efficiency.

This fluid machine is capable of outputting the torque, which is produced in the expansion unit, to the outside through the power transmission unit.

Preferably, the power transmission unit is an electromagnetic clutch that intermittently transmits the external power to the drive shaft. In the fluid machine according to a preferable aspect, disengagement of the electromagnetic clutch reduces the load of a power source that supplies power to the fluid machine.

Preferably, the generating unit generates an alternating current. In the fluid machine according to a preferable aspect, since the generating unit generates the alternating current, comparing with a DC motor, the generating unit is light in weight, has high power generation efficiency, and is easy to be maintained due to the lack of need for a brush.

Preferably, the drive shaft is integrally connected to the first, second and third rotating bodies. In the fluid machine according to a preferable aspect, since the first, second and third rotating bodies are integrally connected to the drive shaft, it is possible to simultaneously operate the pump unit, the expansion unit and the generating unit with a simple configuration.

Preferably, the expansion unit has a variable capacity. In the fluid machine according to a preferable aspect, since the expansion unit has the variable capacity, the capacity of the expansion unit can be adjusted to optimum according to the situation. For instance, immediately after the fluid machine is activated, the capacity of the expansion unit is reduced to prevent the working fluid from being expanded. This alleviates the load on the drive shaft, and reduces the consumed power of the fluid machine.

Preferably, the drive shaft is integrally connected to the first and third rotating bodies, whereas the drive shaft and the second rotating body are connected to each other through a connector. When rotational frequency of the second rotating body is lower than that of the drive shaft, the connector blocks the power transmission between the second rotating body and the drive shaft. When the rotational frequency of the second rotating body is about to get higher than that of the drive shaft, the connector allows the power transmission from the second rotating body to the drive shaft.

In the fluid machine according to a preferable aspect, when the rotational frequency of the second rotating body of the expansion unit is lower than that of the drive shaft, the connector blocks the power transmission between the second rotating body and the drive shaft, whereby the load on the drive shaft is alleviated, and the consumed power of the fluid machine is reduced.

When the rotational frequency of the second rotating body is higher than that of the drive shaft, the connector allows the power transmission from the second rotating body to the drive shaft, whereby the torque produced in the expansion unit is transmitted to the drive shaft. The torque transmitted to the drive shaft is not only converted into electric power by the generating unit but is also used as power for the pump unit. For that reason, if the torque produced in the expansion unit is sufficiently high, the fluid machine can operate independently without receiving external power. Furthermore, the torque produced in the expansion unit can be outputted to the outside through the power transmission unit.

Preferably, the fluid machine further has pump bypass means for reducing the work of the pump unit. In the fluid machine according to a preferable aspect, the pump bypass means reduces the work of the pump unit, whereby the power inputted from the outside can be preferentially used for power generation in the generating unit. Furthermore, the fluid machine can be utilized only as a generator according to the situation, which eliminates the need for an external generator.

Preferably, the drive shaft and the first rotating body are integrally connected to each other, whereas the drive shaft is connected to the second and third rotating bodies through a connector. When rotational frequencies of the second and third rotating bodies are lower than that of the drive shaft, the connector blocks the power transmission between the second and third rotating bodies and the drive shaft. When the rotational frequencies of the second and third rotating bodies are about to get higher than that of the drive shaft, the connector allows the power transmission from the second and third rotating bodies to the drive shaft.

In the fluid machine according to a preferable aspect, when the rotational frequency of the second rotating body of the expansion unit is lower than that of the drive shaft, the connector blocks the power transmission between the second and third rotating bodies and the drive shaft, whereby the load on the drive shaft is alleviated, and the consumed power of the fluid machine is reduced.

The torque produced in the expansion unit is not only converted into electric power by the generating unit but also transmitted through the connector to the drive shaft when the rotational frequencies of the second and third rotating bodies are higher than that of the drive shaft. The torque transmitted to the drive shaft is used as power for the pump unit. If this torque is sufficiently high, the fluid machine can operate independently without receiving external power. Furthermore, the torque produced in the expansion unit can be outputted to the outside through the power transmission unit.

Preferably, the generating unit has a field coil, and an electric generating capacity of the generating unit can be varied by adjusting the amount of current applied to the field coil. In the fluid machine according to a preferable aspect, since the electric generating capacity is variable, the electric generating capacity can be adjusted to optimum according to the situation.

Another invention provides a Rankine circuit having a fluid machine, a heater, and a condenser, which are interposed in a circulation path for circulating a heat medium. The fluid machine is provided with the Rankine circuit including a pump unit that includes a first rotating body, draws in a working fluid along with rotation of the first rotating body, and pressurizes and then discharges the working fluid that has been drawn in; an expansion unit that includes a second rotating body, receives the working fluid, expands and delivers out the received working fluid along with rotation of the second rotating body; a generating unit that includes a third rotating body disposed coaxially with the first and second rotating bodies, and generates electric power along with rotation of the third rotating body; a drive shaft that is integrally connected to the first and third rotating bodies; a power transmission unit that is connected to the drive shaft and transmits external power to the drive shaft; and a connector that connects the drive shaft and the second rotating body to each other, the connector that blocks power transmission between the second rotating body and the drive shaft when rotational frequency of the second rotating body is lower than that of the drive shaft, and allows power transmission from the second rotating body to the drive shaft when the rotational frequency of the second rotating body is about to get higher than that of the drive shaft.

The Rankine circuit according to another invention has a simple configuration because a single fluid machine functions as a pump, a generator, and an expansion unit.

In the Rankine circuit, after the pump unit is started by external power, while the rotational frequency of the second rotating body of the expansion unit is lower than that of the drive shaft, the connector blocks the power transmission between the second rotating body and the drive shaft. During a given duration from a time point when the pump unit is started, the load on the drive shaft is alleviated, and the consumed power of the fluid machine is reduced.

When the rotational frequency of the second rotating body is higher than that of the drive shaft, the connector allows the power transmission from the second rotating body to the drive shaft, whereby the torque produced in the expansion unit is transmitted to the drive shaft. The torque transmitted to the drive shaft is not only converted into electric power by the generating unit but also used as power for the pump unit. For that reason, if the torque produced in the expansion unit is sufficiently high, the fluid machine can operate independently without receiving external power. Furthermore, the torque produced in the expansion unit can be outputted to the outside through the power transmission unit.

Preferably, the Rankine circuit further includes a check valve that is interposed in a section of the circulation path, which extends between the pump unit of the fluid machine and the heater, and a circulation-path on-off valve that is interposed in a section of the circulation path, which extends between the heater and the expansion unit of the fluid machine.

In the Rankine circuit according to a preferable aspect, when the circulation-path on-off valve is closed, the external power is accumulated as pressure energy in a section of the circulation path, which extends from the check valve to the circulation-path on-off valve. When the circulation-path on-off valve is opened, the accumulated pressure energy is converted into torque in the expansion unit, and then converted into electric power in the generating unit. In short, the Rankine circuit accumulates the external power in a form other than electric power according to the situation.

Preferably, the generating unit has a field coil, and an electric generating capacity of the generating unit can be varied by adjusting the amount of current applied to the field coil.

In the Rankine circuit according to a preferable aspect, since the electric generating capacity is variable, the electric generating capacity can be adjusted to optimum according to the situation. For example, in this Rankine circuit, the external power or the torque produced in the expansion unit is convertible into electric power in the generating unit. If the external power or torque is sufficient, the electric generating capacity is increased. If not, the electric generating capacity is reduced, whereby the external power or the torque is effectively used. Alternatively, if the electric generating capacity is reduced when the external power is converted into pressure, the external power is preferentially converted into pressure.

Preferably, the Rankine circuit further includes pump bypass means for reducing the work of the pump unit.

In the Rankine circuit according to a preferable aspect, the pump bypass means reduces the work of the pump unit, whereby the power inputted from the outside can be preferentially used for power generation in the generating unit. To put it differently, the fluid machine can be utilized only as a generator according to the situation, which eliminates the need for an external generator.

Another invention provides a Rankine circuit having a fluid machine, a heater, and a condenser, which are interposed in a circulation path for circulating a heat medium. The fluid machine has a pump unit that includes a first rotating body, draws in a working fluid along with rotation of the first rotating body, and pressurizes and then discharges the working fluid that has been drawn in; an expansion unit that includes a second rotating body, receives the working fluid along with rotation of the second rotating body, and expands and delivers out the received working fluid; a generating unit that includes a third rotating body disposed coaxially with the first and second rotating bodies, and generates electric power along with rotation of the third rotating body; a drive shaft that is integrally connected to the first rotating body; and a power transmission unit that is connected to the drive shaft and transmits external power to the drive shaft, a connector that connects the drive shaft to the second and third rotating bodies, the connector that blocks power transmission between the second and third rotating bodies and the drive shaft when rotational frequencies of the second and third rotating bodies are lower than that of the drive shaft, and allows power transmission from the second and third rotating bodies to the drive shaft when the rotational frequencies of the second and third rotating bodies are about to get higher than that of the drive shaft.

The Rankine circuit according to another invention has a simple configuration because a single fluid machine functions as a pump, a generator, and an expansion unit.

In the Rankine circuit, after the pump unit is started by external power, while the rotational frequency of the second rotating body of the expansion unit is lower than that of the drive shaft, the connector blocks the power transmission between the second and third rotating bodies and the drive shaft. During a given duration from a time point when the pump unit is started, the load on the drive shaft is alleviated, and the consumed power of the fluid machine is reduced.

The torque produced in the expansion unit is not only converted into electric power by the generating unit but also transmitted through the connector to the drive shaft when the rotational frequencies of the second and third rotating bodies are higher than that of the drive shaft. The torque transmitted to the drive shaft is used as power for the pump unit. If this torque is sufficiently high, the fluid machine can operate independently without receiving external power. Furthermore, the torque produced in the expansion unit can be outputted to the outside through the power transmission unit.

Preferably, the Rankine circuit further includes a check valve that is interposed in the section of the circulation path, which extends between the pump unit of the fluid machine and the heater, and a circulation-path on-off valve that is interposed in a section of the circulation path, which extends between the heater and the expansion unit of the fluid machine.

In the Rankine circuit according to a preferable aspect, when the circulation-path on-off valve is closed, the external power is accumulated as pressure energy in a section of the circulation path, which extends from the check valve to the circulation-path on-off valve. When the circulation-path on-off valve is opened, the accumulated pressure energy is converted into torque in the expansion unit, and then converted into electric power in the generating unit. In short, the Rankine circuit accumulates the external power in a form other than electric power according to the situation.

Another invention provides a Rankine circuit having a fluid machine, a heater, and a condenser, which are interposed in a circulation path for circulating a heat medium. The fluid machine has a pump unit that includes a first rotating body, draws in a working fluid along with rotation of the first rotating body, and pressurizes and then discharges the working fluid that has been drawn in; an expansion unit that includes a second rotating body, receives the working fluid along with rotation of the second rotating body, and expands and then delivers out the received working fluid; a generating unit that includes a third rotating body disposed coaxially with the first and second rotating bodies, and generates electric power along with rotation of the third rotating body; a drive shaft that is integrally connected to the first, second and third rotating bodies; and a power transmission unit that is connected to the drive shaft and transmits external power to the drive shaft.

The Rankine circuit according to another invention has a simple configuration because a single fluid machine functions as a pump, a generator, and an expansion unit.

Preferably, the Rankine circuit further includes a check valve that is interposed in a section of the circulation path, which extends between the pump unit of the fluid machine and the heater; a circulation-path on-off valve that is interposed in a section of the circulation path, which extends between the heater and the expansion unit of the fluid machine; and pressure-reduction preventing means for preventing a pressure drop in a section of the circulation path, which extends between the circulation-path on-off valve and the expansion unit along with the rotation of the second rotating body when the circulation-path on-off valve is closed.

Preferably, in the Rankine circuit according to a preferable aspect, the external power is accumulated as pressure energy in the section of the circulation path, which extends from the check valve to the circulation-path on-off valve. When the circulation-path on-off valve is opened, the accumulated pressure energy is converted into torque in the expansion unit, and then converted into electric power in the generating unit. In short, the Rankine circuit is capable of storing the external power in a form other than electric power according to the situation.

At the same time, when the circulation-path on-off valve is closed, if the pressure-reduction preventing means prevents a pressure drop in the section of the circulation path, which extends between the circulation-path on-off valve and the expansion unit, the expansion unit does not operate in a state like a vacuum pump. For that reason, even if the circulation-path on-off valve is closed, the consumed power of the expansion unit is suppressed from being increased, and the external power is preferentially converted into pressure and then accumulated.

Preferably, the pressure-reduction preventing means has an external return path that is interposed in the circulation path in parallel with the expansion unit, and a return-path on-off valve that opens/closes the external return path. In the Rankine circuit according to a preferable aspect, the pressure preventing means has a simple configuration.

Preferably, the pressure-reduction preventing means has an internal return path that is disposed in the expansion unit of the fluid machine and sends to an upstream side the heat medium that is being expanded or has been expanded, and a return-path on-off valve that opens/closes the internal return path. In the Rankine circuit according to a preferable aspect, the pressure preventing means has a simple configuration.

Preferably, the return-path on-off path is an electromagnetic valve. In the Rankine circuit according to a preferable aspect, the pressure preventing means has a simple configuration.

Preferably, the return-path on-off path is a non-return valve. In the Rankine circuit according to a preferable aspect, the pressure preventing means has a simpler configuration.

Preferably, the expansion unit has a variable capacity. In the Rankine circuit according to a preferable aspect, since the expansion unit has the variable capacity, the capacity of the expansion unit can be adjustable to optimum according to the situation. For instance, immediately after the fluid machine is activated, the capacity of the expansion unit is reduced to prevent the working fluid from being expanded. This alleviates the load on the drive shaft, and reduces the consumed power of the fluid machine.

Preferably, the generating unit has a field coil, and an electric generating capacity of the generating unit can be varied by adjusting the amount of current applied to the field coil. In the Rankine circuit according to a preferable aspect, since the electric generating capacity is variable, the electric generating capacity can be adjusted to optimum according to the situation. For example, in this Rankine circuit, the external power or the torque produced in the expansion unit is convertible into electric power in the generating unit. If there is sufficient external power or torque, the electric generating capacity is increased. If not, the electric generating capacity is reduced, whereby the external power or the torque is effectively used. Alternatively, the electric generating capacity is reduced when the external power is converted into pressure, whereby the external power is preferentially converted into pressure.

Preferably, the Rankine circuit further has pump bypass means for reducing the work of the pump unit. In the Rankine circuit according to a preferable aspect, the pump bypass means reduces the work of the pump unit, whereby the power inputted from the outside can be preferentially used for power generation in the generating unit. To put it differently, the fluid machine can be utilized only as a generator according to the situation, which eliminates the need for an external generator.

Another invention provides a system for utilizing waste heat from a vehicle, which has a Rankine circuit installed in a vehicle. The Rankine circuit includes a fluid machine, a heater that transfers waste heat generated in an internal combustion engine of the vehicle to a heat medium, and a condenser, which are interposed in a circulation path for circulating the heat medium. The fluid machine has a pump unit that includes a first rotating body, draws in the heat medium along with rotation of the first rotating body, and pressurizes and then discharges the heat medium that has been drawn in; an expansion unit that includes a second rotating body, receives the heat medium, and expands and then delivers out the received heat medium along with rotation of the second rotating body; a generating unit that includes a third rotating body that is disposed coaxially with the first and second rotating bodies, and generates electric power along with rotation of the third rotating body; a drive shaft that is integrally connected to the first and third rotating bodies; a power transmission unit that is connected to the drive shaft and the internal combustion engine of the vehicle, and transmits power from the internal combustion engine to the drive shaft; and a connector that connects the drive shaft and the second rotating body to each other, the connector that blocks power transmission between the second rotating body and the drive shaft when rotational frequency of the second rotating body is lower than that of the drive shaft, and allows power transmission from the second rotating body to the drive shaft when the rotational frequency of the second rotating body is about to get higher than that of the drive shaft.

Another invention provides a system for utilizing waste heat from a vehicle, which has a Rankine circuit installed in a vehicle. The Rankine circuit includes a fluid machine, a heater that transfers waste heat generated in an internal combustion engine of the vehicle to the heat medium, and a condenser, which are interposed in a circulation path for circulating a heat medium. The fluid machine has a pump unit that includes a first rotating body, draws in the heat medium along with rotation of the first rotating body, and pressurizes and then discharges the heat medium that has been drawn in; an expansion unit that includes a second rotating body, receives the heat medium, and expands and then delivers out the received heat medium along with rotation of the second rotating body; a generating unit that includes a third rotating body that is disposed coaxially with the first and second rotating bodies, and generates electric power along with rotation of the third rotating body; a drive shaft that is integrally connected to the first rotating body; a power transmission unit that is connected to the drive shaft and the internal combustion engine of the vehicle, and transmits power from the internal combustion engine to the drive shaft; and a connector that connects the drive shaft to the second and third rotating bodies, the connector that blocks power transmission between the second and third rotating bodies and the drive shaft when rotational frequencies of the second and third rotating bodies are lower than that of the drive shaft, and allows power transmission from the second and third rotating bodies to the drive shaft when the rotational frequencies of the second and third rotating bodies are about to get higher than that of the drive shaft.

Another invention provides a system for utilizing waste heat from a vehicle, which has a Rankine circuit installed in a vehicle. The Rankine circuit includes a fluid machine, a heater that transfers waste heat generated in an internal combustion engine of the vehicle to the heat medium, and a condenser, which are interposed in a circulation path for circulating a heat medium. The fluid machine has a pump unit that includes a first rotating body, draws in the heat medium along with rotation of the first rotating body, and pressurizes and then discharges the heat medium that has been drawn in; an expansion unit that includes a second rotating body, receives the heat medium, and expands and then delivers out the received heat medium along with rotation of the second rotating body; a generating unit that includes a third rotating body that is disposed coaxially with the first and second rotating bodies, and generates electric power along with rotation of the third rotating body; a drive shaft that is integrally connected to the first, second and third rotating bodies; and a power transmission unit that is connected to the drive shaft and the internal combustion engine of the vehicle, and transmits power from the internal combustion engine to the drive shaft.

The system for utilizing waste heat from a vehicle according to the invention has a simple configuration because a single fluid machine functions as a pump, an expander, and a generator. A configuration for connecting the internal combustion engine and the power transmission device of the fluid machine to each other is also simple. Consequently, the system for utilizing waste heat is easy to install in a vehicle.

According to the system for utilizing waste heat, the waste heat from the internal combustion engine is converted into electric power, so that fuel consumption of the vehicle is improved. Moreover, since the internal combustion engine and the power transmission unit of the fluid machine are connected to each other, it is possible to convert a kinetic energy into electric power when the vehicle is braked or decelerated. According to the system for utilizing waste heat, therefore, the fuel consumption of the vehicle is further improved.

BRIEF DESCRIPTION OF THE DRAWINGS

The invention can be fully understood through the following detailed descriptions and the attached drawings. However, the drawings show examples and do not limit the invention.

BEST MODE OF CARRYING OUT THE INVENTION

Figure 1:
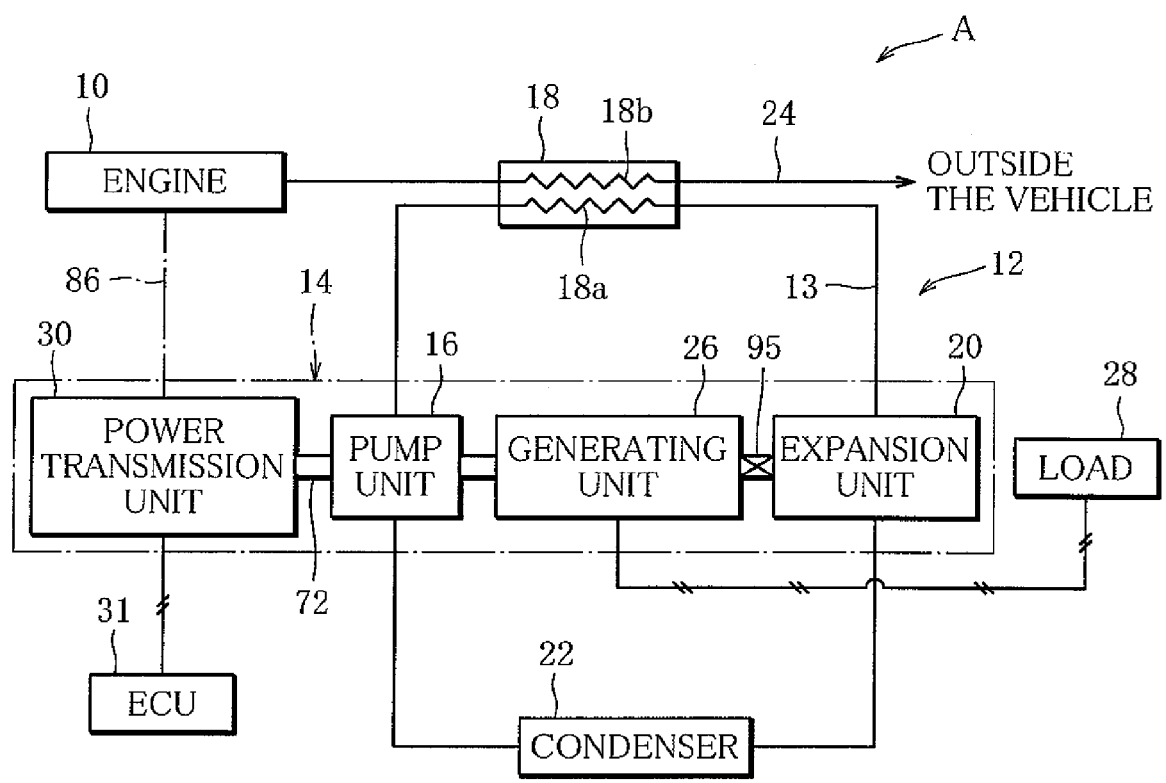
FIG. 1 is a schematic view showing a configuration of a system for utilizing waste heat from a vehicle according to a first embodiment.

FIG. 1 shows a system A for utilizing waste heat from a vehicle according to a first embodiment. The system A for utilizing waste heat, for example, retrieves the heat of exhaust gas discharged from a vehicle engine (internal combustion engine) 10. The system A for utilizing waste heat has a Rankine circuit 12. The Rankine circuit 12 includes a circulation path 13 through which a working fluid (heat medium) circulates. The circulation path 13 is constructed, for example, of a duct or a pipe.

A pump unit 16 of a fluid machine 14 is interposed in the circulation path 13 in order to flow the working fluid. Furthermore, a heater 18, an expansion unit 20 of the fluid machine 14, and the condenser 22 are also interposed in the circulation path 13 on the downstream side of the pump unit 16 as seen in a direction that the working fluid flows. The pump unit 16 draws in the working fluid on the condenser 22 side. The pump unit 16 then pressurizes the working fluid that has been drawn in, and discharges the working fluid toward the heater 18. The working fluid discharged from the pump unit 16 is in the form of liquid having low temperature and high pressure.

The heater 18 is a heat exchanger, and includes a low-temperature flow path 18a constructing a section of the circulation path 13, and a high-temperature flow path 18b capable of exchanging heat with the low-temperature flow path 18a. The high-temperature flow path 18b is interposed in an exhaust pipe 24 extending, for example, from an engine 10. When passing through the heater 18, the low-temperature and high-pressure working fluid in the liquid form receives the heat of the exhaust gas produced in the engine 10. The heater 18 transfers the heat of the exhaust gas to the working fluid. In result, the working fluid is heated and brought into a high-temperature and high-pressure superheated steam state.

The expansion unit 20 of the fluid machine 14 expands the working fluid that has come into the superheated steam state. The working fluid is thus brought into a high-temperature and low-pressure superheated steam state.

The condenser 22 is a heat exchanger, and condenses the working fluid that has flown out of the expansion unit 20 by exchanging heat with outside air, to thereby bring the working fluid into a low-temperature and low-pressure liquid form. To be specific, an electric fan (not shown) is disposed near the condenser 22, and the working fluid is refrigerated by wind blowing from before backward in the vehicle and wind from the electric fan. The working fluid refrigerated in the condenser 22 is drawn in again by the pump unit 16 and circulates through the circulation path 13.

The expansion unit 20 is capable of not only expanding the working fluid but also outputting the heat energy of the working fluid after converting the heat energy into torque (rotational force). In addition to the pump unit 16, a generating unit 26 is connected to the expansion unit 20 so that the torque outputted from the expansion unit 20 may be used. An electric load 28, such as a battery, which uses or accumulates the generated electric power, is properly connected to the generating unit 26.

The fluid machine 14 has a power transmission unit 30 for inputting/outputting the torque. The power transmission unit 30 is, for example, an electromagnetic clutch. The electromagnetic clutch is actuated by ECU (electrical control unit) 31, and is capable of intermittently transmitting the torque.

Figure 2:
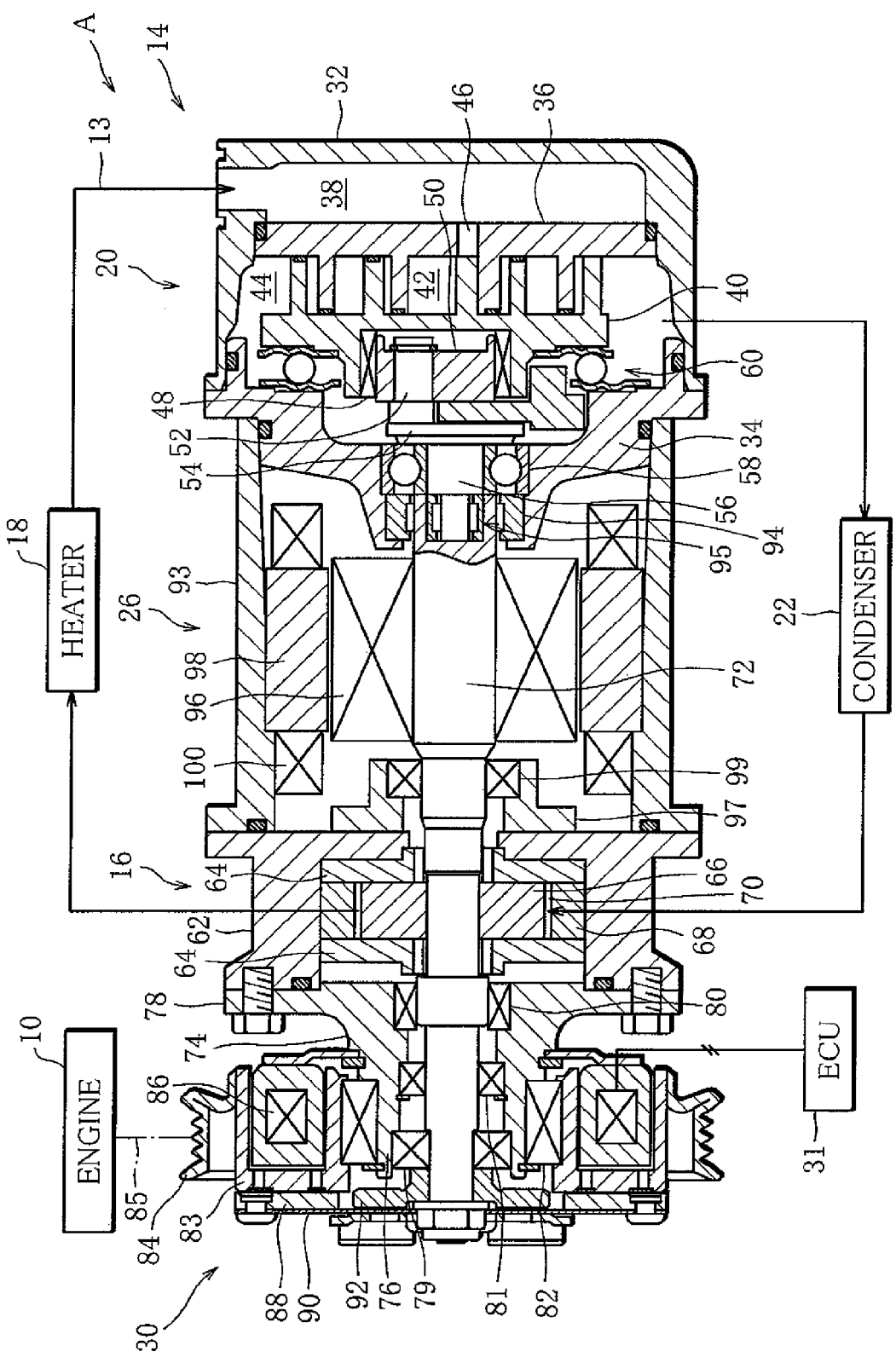
FIG. 2 is a schematic longitudinal sectional view of a fluid machine applied to the system shown in FIG. 1.

To be more concrete, as illustrated in FIG. 2, the expansion unit 20, the generating unit 26 and the pump unit 16 are serially connected together in the order named.

The expansion unit 20 is, for example, a scroll-type expander. A cup-shaped casing 32 (expansion-unit casing) of the expansion unit 20 has an opening that is virtually covered with a partition wall 34. A through-hole is formed in the center of the partition wall 34.

In the expansion-unit casing 32, a fixed scroll 36 is fixed, and a high-pressure chamber 38 is partitioned off on a back side of the fixed scroll 36. The high-pressure chamber 38 communicates with the heater 18 through an inlet port formed in the expansion-unit casing 32 and a section of the circulation path 13, which is connected to the inlet port.

On a front side of the fixed scroll 36, a movable scroll 40 is so set as to be engaged with the fixed scroll 36. An expansion chamber 42 that expands the working fluid is marked off between the fixed scroll 36 and the movable scroll 40. A space surrounding the movable scroll 40 is marked off as a low-pressure chamber 44 that takes in the expanded working fluid. An induction hole 46 is formed through substantially the center of a base plate of the fixed scroll 36. The expansion chamber 42 that is located in a diametrically center of the fixed and movable scrolls 36 and 40 communicates with the high-pressure chamber 38 through the induction hole 46.

If the working fluid is expanded in the expansion chamber 42 located in the diametrically center, the expansion chamber 42 is increased in capacity and is displaced diametrically outward along the vertical walls of the fixed and movable scrolls 36 and 40. The expansion chamber 42 eventually communicates with the low-pressure chamber 44, and the expanded working fluid flows into the low-pressure chamber 44. The low-pressure chamber 44 communicates with the condenser 22 through an outlet port, not shown, and a part of the circulation path 13, which is connected to the outlet port.

Along with the expansion of the working fluid, the movable scroll 40 is caused to orbit relative to the fixed scroll 36. This orbital motion is converted into rotational motion by orbital mechanism.

In other words, a boss is integrally formed in a back face of a base plate of the movable scroll 40. An eccentric bush 50 is placed within the boss so as to be allowed to make relative rotation through a needle bearing 48. A crank pin 52 is inserted through the eccentric bush 50. The crank pin 52 projects from a disc 54 in an eccentric position. A shaft (second rotating body) 56 integrally projects from the opposite side of the disc 54 to the crank pin 52 concentrically with the crank pin 52. The shaft 56 is rotatably supported by the partition wall 34 through a radial bearing 58, such as a ball bearing. In short, the orbital motion of the movable scroll 40 is converted into the rotational motion of the shaft 56.

The orbital mechanism has, for example, a ball coupling 60 for preventing an axial rotation of the movable scroll 40 in orbital motion and receiving thrust pressure. The ball coupling 60 is set between an outer circumferential portion of the base plate of the movable scroll 40 and a portion of the partition wall 34, which faces the outer circumferential portion.

The pump unit 16 is, for example, a trochoid pump, but may be a gear pump. The pump unit 16 has a cylindrical casing (pump-unit casing 62) that is open at both ends. A pair of ring-like covers 64 are placed in the pump-unit casing 62 with given distance away from each other. An internal gear (first rotating body) 66 is rotatably disposed between the covers 64, and an external gear 68 is fixedly arranged around the internal gear 66.

A pump chamber 70 that pressurizes the working fluid along with rotation of the internal gear 66 is marked off between the internal gear 66 and the external gear 68. The working fluid is drawn from the condenser 22 into the pump chamber 70 through an intake port, not shown, and a section of the circulation path 13, which is connected to the intake port. The working fluid that has been pressurized within the pump chamber 70 is discharged toward the heater 18 through a discharge port, not shown, and a portion of the circulation path 13, which is connected to the discharge port.

In order to rotate the internal gear 66, the internal gear 66 is integrally and rotatably fixed to a drive shaft 72. The drive shaft 72 penetrates the cover 64 and the pump-unit casing 62.

The drive shaft 72 also penetrates a lid member 74 fixed to the open end of the pump-unit casing 62. The lid member 74 is made up of a cylinder 76 and a flange 78. The flange 78 is fitted to the open end of the pump-unit casing 62.

Inside the cylinder 76, radial bearings 79 and 80 are arranged in their respective ends of the cylinder 76. The cylinder 76 rotatably supports the drive shaft 72 through the radial bearings 79 and 80. A shaft sealer 81 such as a lip seal is placed in the cylinder 76, and airtightly marks off the inside of the cylinder 76.

An electromagnetic clutch functioning as the power transmission unit 30 is connected to one end of the drive shaft 72 projecting from the cylinder 76.

To be concrete, the power transmission unit 30 has a rotor 83 disposed outside the cylinder 76 through a radial bearing 82. A pulley 84 is fixed onto an outer circumferential surface of the rotor 83. A belt 85, shown by a dashed line, is bridged between the pulley 84 and a pulley of the engine 10. When supplied with power from the engine 10, for example, the pulley 84 and the rotor 83 are able to rotate. A solenoid 86 is disposed inside the rotor 83. The solenoid 86 is fed with electricity from the ECU 31 and thus generates a magnetic field.

A ring-like armature 88 is disposed near an end face of the rotor 83. The armature 88 is connected to a boss 92 through an elastic member 90 such as a leaf spring. The boss 92 is fitted to one end of the drive shaft 72 through splines, so that the armature 88 can rotate integrally with the drive shaft 72. Because of a magnetic field of the solenoid 86, the armature 88 is able to stick to the rotor 83 while resisting against a biasing force of the elastic member 90. Accordingly, power can be transmitted between the rotor 83 and the armature 88.

A cylindrical casing (generating-unit casing) 93 of the generating unit 26 is sandwiched between the partition wall 34 and the pump-unit casing 62. The expansion-unit casing 32, the partition wall 34, the generating-unit casing 93, the pump-unit casing 62, and the lid member 74 are connected together, thereby making up a single housing for the fluid machine 14.

In the generating-unit casing 93, there is disposed a support member 97 that is fixed to the pump-unit casing 62. A central portion of the drive shaft 72 is rotatably supported by the pump-unit casing 62 through a radial bearing 99 and the support member 97.

The other end of the drive shaft 72 reaches the through-hole of the partition wall 34. The other end of the drive shaft 72 is rotatably supported by the partition wall 34 through a needle bearing 94. A one-way clutch 95 functioning as a connector is fixed to the inside of the other end of the drive shaft 72. The other end of the drive shaft 72 and the shaft 56 of the orbital mechanism are connected to each other through the one-way clutch 95.

If a rotational frequency of the shaft 56 is lower than that of the drive shaft 72 when the shaft 56 and the drive shaft 72 rotate in the same direction, the one-way clutch 95 blocks the power transmission between the shaft 56 and the drive shaft 72. If the rotational frequency of the shaft 56 is about to get higher than that of the drive shaft 72, the one-way clutch 95 allows the power transmission between the shaft 56 and the drive shaft 72. In result, the shaft 56 and the drive shaft 72 rotate integrally with each other.

A rotor (third rotating body) 96 is fixed to a section of the drive shaft 72, which extends through the generating-unit casing 93. The rotor 96 is made up, for example, of permanent magnet. The rotor 96 is thus positioned coaxially with the shaft 56 and the internal gear 66.

A stator is fixed to the inner circumferential surface of the generating-unit casing 93 so as to surround the rotor 96. The stator has a yoke 98 and, for example, three coils 100 wound around the yoke 98. The coils 100 are so wired as to generate three-phase alternating current along with rotation of the rotor 96. The alternating current that has been generated is supplied to the external load 28 through a leading line, not shown.

The generating unit 26 does not function as a motor, so that the shape of the yoke 98, the number of windings of the coils 100, and the like, are determined so that power generation efficiency becomes high.

A method of using the system A for utilizing waste heat from a vehicle will be described below with a focus on operations of the fluid machine 14 and the Rankine circuit 12.

<Activation>

When the ECU 31 turns on the power transmission unit 30 to activate the Rankine circuit 12, the power of the engine 10 is inputted to the drive shaft 72. The internal gear 66 of the pump unit 16 rotates along with the rotation of the drive shaft 72. The pump unit 16 draws in the working fluid on the upstream side. The pump unit 16 then pressurizes the working fluid that has been drawn in, and discharges the working fluid on the downstream side.

The working fluid is thus circulated through the circulation path 13. The working fluid is heated by the heater 18 and expanded by the expansion unit 20.

Immediately after the activation of the Rankine circuit 12, the working fluid in the circulation path 13 is low in pressure. The rotational frequency of the movable scroll 40, namely, the rotational frequency of the shaft 56 of the orbital mechanism, is lower than that of the drive shaft 72. The one-way clutch 95 blocks the power transmission between the shaft 56 and the drive shaft 72.

<Automatic Drive and Power Generation>

After the activation of the Rankine circuit 12, if the pressure of the working fluid in the circulation path 13 is sufficiently increased, the rotational frequency of the shaft 56 of the orbital mechanism is about to get higher than that of the drive shaft 72. If the rotational frequency of the shaft 56 of the orbital mechanism in a free state becomes higher than that of the drive shaft 72, the one-way clutch 95 comes into a locked state, and the shaft 56 and the drive shaft 72 rotate integrally with each other.

If the torque transmitted from the shaft 56 to the drive shaft 72 becomes high enough to operate the pump unit 16, the ECU 31 turns off the power transmission unit 30 and blocks the power supply from the engine 10. The fluid machine 14 is switched to automatic drive in which the pump unit 16 is operated by using the torque generated in the expansion unit 20.

At the same time, the rotor 96 of the generating unit 26 rotates along with the rotation of the drive shaft 72, and the generating unit 26 generates alternating current. The alternating current is supplied to the load 28, and is properly accumulated or consumed by the load 28. The load 28 may include a rectifier that converts alternating current into direct current.

<Regenerative Braking>

After the fluid machine 14 is switched to the automatic drive, the load of the engine 10 is decreased. However, when the vehicle is braked or decelerated, the power transmission unit 30 may be turned on by the ECU 31. That is, the electromagnetic clutch may be engaged. By so doing, the fluid machine 14 fully functions as a regenerative brake, and an auxiliary load for deceleration is applied to the engine 10. Furthermore, the generating unit 26 generates electricity, and a kinetic energy of the vehicle is converted into electric power.

<Other Operations>

The torque of the fluid machine 14 may be supplied to the engine 10 without switching the fluid machine 14 to the automatic drive. An extra portion of the torque generated in the expansion unit 20, which remains after the torque is consumed in the pump unit 16 and the generating unit 26, may be outputted to the engine 10 through the power transmission unit 30.

As described, the system A for utilizing waste heat from a vehicle according to the first embodiment converts the waste heat, which is generated in the engine 10 of the vehicle, into electric power by using the fluid machine 14. Consequently, the fuel consumption of the vehicle is improved.

The system A for utilizing waste heat from a vehicle has a simple configuration because the single fluid machine 14 functions as a pump, a generator, and an expansion unit.

Particularly in the fluid machine 14, since the internal gear 66 of the pump unit 16, the shaft 56 of the expansion unit 20, and the rotor 96 of the generating unit 26 are coaxially arranged, the fluid machine 14 can be downsized. The fluid machine 14 is therefore light in weight and low in cost, thereby having high installability in the vehicle.

In the fluid machine 14, the drive shaft 72 and the internal gear 66 of the pump unit 16 are at least integrally connected to each other, and the power transmission unit 30 for transmitting external power is connected to the drive shaft 72. The pump unit 16 can therefore be started by external power. Accordingly, the generating unit 26 is not required to serve as an electric motor. In the fluid machine 14, therefore, the generating unit 26 is so constructed that the power generation efficiency is high, and the power transmitted through the drive shaft 72 is converted into electric power with high efficiency.

With the fluid machine 14, the torque generated in the expansion unit 20 can be outputted to the outside and used, and the power of the engine 10 can be compensated.

In the system A for utilizing waste heat from a vehicle, after the pump unit 16 of the fluid machine 14 is started by external power, during a period in which the rotational frequency of the shaft 56 of the expansion unit 20 is lower than that of the drive shaft 72, the one-way clutch 95 functioning as a connector blocks the power transmission between the shaft 56 and the drive shaft 72. During a given period after the pump unit 16 is started, the load applied to the drive shaft 72 is alleviated, and the consumed power of the fluid machine 14 is reduced.

The invention is not limited to the first embodiment, and may be modified in various ways.

For example, the system A for utilizing waste heat converts the heat of exhaust gas into electric power, but may convert the heat of cooling water of the engine 10 into electric power. The system A for utilizing waste heat does not necessarily have to be applied to a vehicle. Nevertheless, the system A is suitable for a vehicle since the engine 10 and the power transmission unit 30 can be easily connected to each other.

The generating unit 26 of the fluid machine 14 generates alternating current, but may generate direct current. However, as compared to a DC generator (DC motor), the generating unit 26 that generates alternating current is light in weight and high in power generation efficiency. The generating unit 26 also does not require a brush, thereby facilitating the maintenance.

Although the drive shaft 72 of the fluid machine 14 is made up of one member, it is also possible to construct the drive shaft by integrally connecting a plurality of members together by means of couplings or the like.

In the fluid machine 14, the power transmission unit 30 is an electromagnetic clutch capable of maintaining power. However, the power transmission unit 30 may be a simple pulley that constantly transmits power. On the other hand, the electromagnetic clutch can properly continue the input/output of torque between the fluid machine 14 and the outside.

Figure 3:
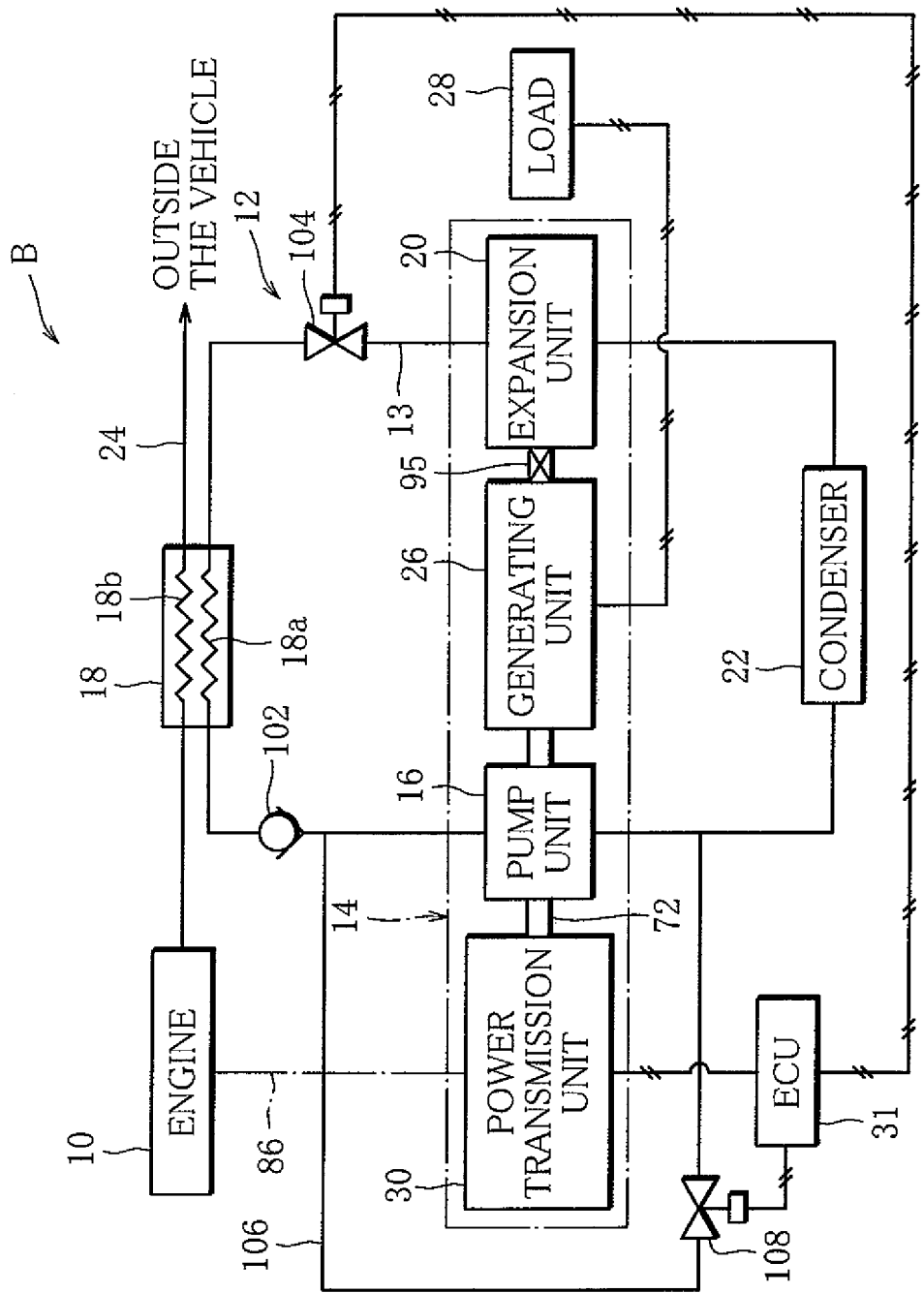
FIG. 3 is a schematic view showing a configuration of a system for utilizing waste heat from a vehicle according to a second embodiment.

FIG. 3 shows a schematic configuration of a system B for utilizing waste heat from a vehicle according to a second embodiment. Components identical to those of the system A for utilizing waste heat according to the first embodiment will be provided with the same reference marks, and the explanation thereof will be omitted.

The system B for utilizing waste heat further includes a check valve 102 and a circulation-path on-off valve 104. The check valve 102 is interposed in a section of the circulation path 13, which extends between the pump unit 16 of the fluid machine 14 and the heater 18. The check valve 102 allows the working fluid to pass only in a direction from the pump unit 16 toward the heater 18. The circulation-path on-off valve 104 is interposed in a section of the circulation path 13, which extends between the heater 18 and the expansion unit 20 of the fluid machine 14, and is capable of opening/closing the circulation path 13 in response to signals from the ECU 31.

The system B for utilizing waste heat has pump bypass means. The pump bypass means is made up of an external bypass 106 that is disposed in the circulation path 13 in parallel with the pump unit 16, and a bypass on-off valve 108 that is interposed in the external bypass 106. The bypass on-off valve 108 is an electromagnetic valve and capable of opening/closing the external bypass 106 in response to signals from the ECU 31.

In the system B for utilizing waste heat, by closing the circulation path 13 with the circulation-path on-off valve 104 before the expansion unit 20, external power is accumulated as pressure energy in a section of the circulation path 13, which extends from the check valve 102 to the circulation-path on-off valve 104. When the circulation-path on-off valve 104 is opened, the accumulated pressure energy is converted into torque in the expansion unit 20, and then converted into electric power in the generating unit 26 (regeneration of accumulation pressure). In short, the system B for utilizing waste heat accumulates the external power in a form other than electric power according to the situation.

In the system B for utilizing waste heat, if the work of the pump unit 16 is reduced by bypassing the pump unit 16 with the pump bypass means. This makes it possible to preferentially use the power inputted from the outside for power generation in the generating unit 16. To put it differently, the fluid machine 14 can be utilized only as a generator according to the situation, which eliminates the need for an external generator (alternator) and enables the downsizing of the vehicle.

Figure 4:
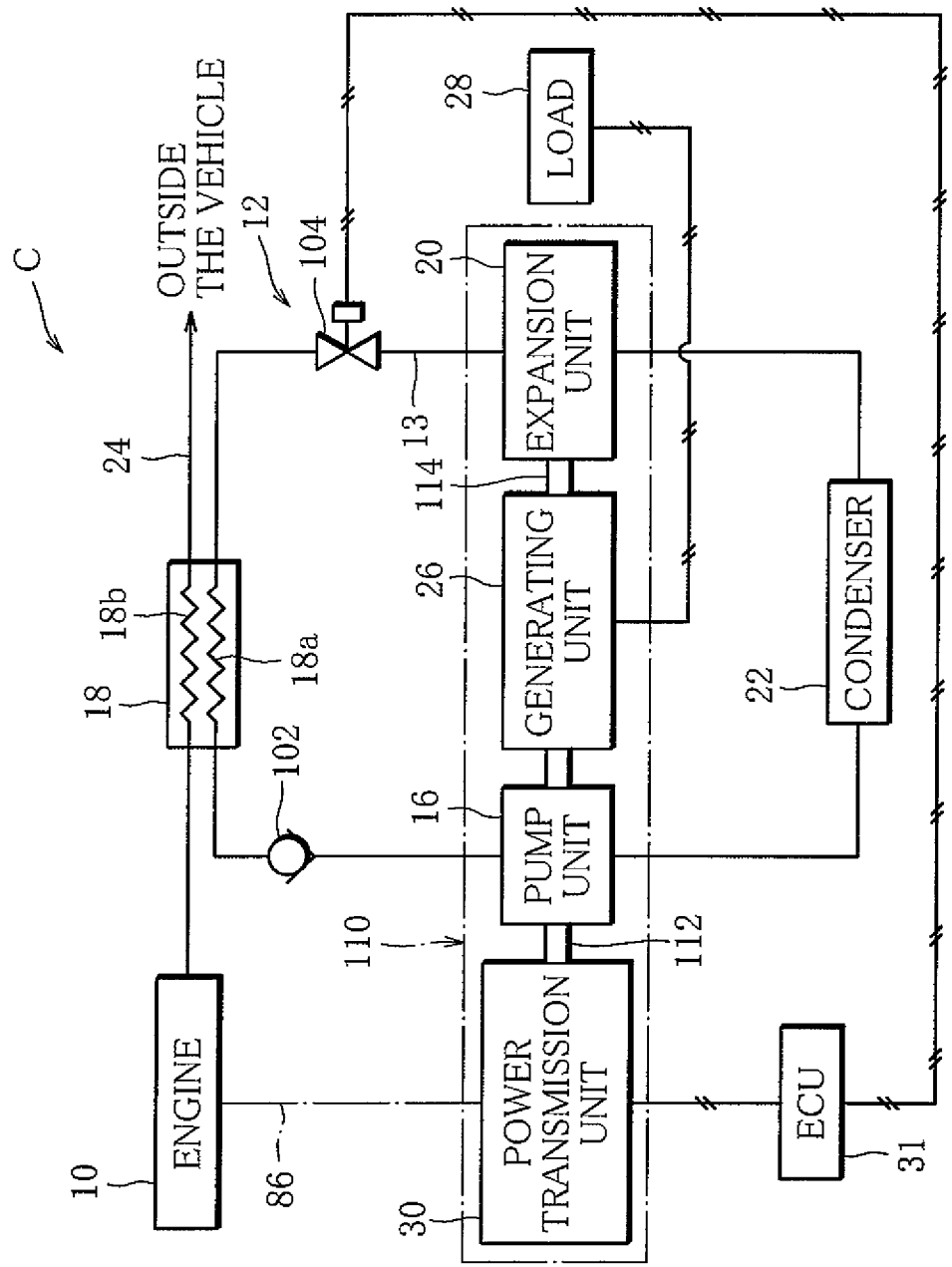
FIG. 4 is a schematic view showing a configuration of a system for utilizing waste heat from a vehicle according to a third embodiment.

FIG. 4 shows a schematic configuration of a system C for utilizing waste heat from a vehicle according to a third embodiment. Components identical to those of the system A for utilizing waste heat according to the first embodiment and those of the system B for utilizing waste heat according to the second embodiment will be provided with the same reference marks, and the explanation thereof will be omitted.

In a fluid machine 110 applied to the system C for utilizing waste heat, the power transmission unit 30 and the internal gear 66 of the pump unit 16 are integrally connected to a first drive shaft 112. The rotor 96 of the generating unit 30 and the shaft 56 of the expansion unit 20 are integrally connected to a second drive shaft 114. The first drive shaft 112 and the second drive shaft 114 are connected to each other through a one-way clutch 116 functioning as a connector.

When rotational frequency of the second drive shaft 114, or that of the shaft 56 and of the rotor 96, is lower than rotational frequency of the first drive shaft 112, the one-way clutch 116 blocks power transmission between the first drive shaft 112, the second drive shaft 114 and the first drive shaft 112. If the rotational frequency of the second drive shaft 114 is about to get higher than that of the drive shaft 72, the one-way clutch 116 allows the power transmission between the first drive shaft 112 and the second drive shaft 114. In result, the first drive shaft 112 and the second drive shaft 114 rotate integrally with each other.

In the system C for utilizing waste heat, too, during a given period after the fluid machine 110 is activated, the power transmission from the first drive shaft 112 to the second drive shaft 114 is blocked by the one-way clutch 116, and the consumed power of the fluid machine 110 is reduced.

The torque generated in the expansion unit 30 is not only converted into electric power by the generating unit 26 but also transmitted through the one-way clutch 116 to the first drive shaft 112 when the rotational frequency of the second drive shaft 114 is higher than that of the first drive shaft 112. The torque transmitted to the first drive shaft 112 is used as power for the pump unit 16. If this torque is sufficiently high, the fluid machine 110 is able to operate independently without receiving external power. Furthermore, the torque produced in the expansion unit 20 can be outputted to the outside through the power transmission unit 30.

The system C for utilizing waste heat is also capable of accumulating pressure energy by closing the circulation-path on-off valve 104 and of converting the accumulated pressure energy into electric power. As in the system A for utilizing waste heat, the check valve 102 and the circulation-path on-off valve 104 may be eliminated from the system C for utilizing waste heat.

Figure 5:
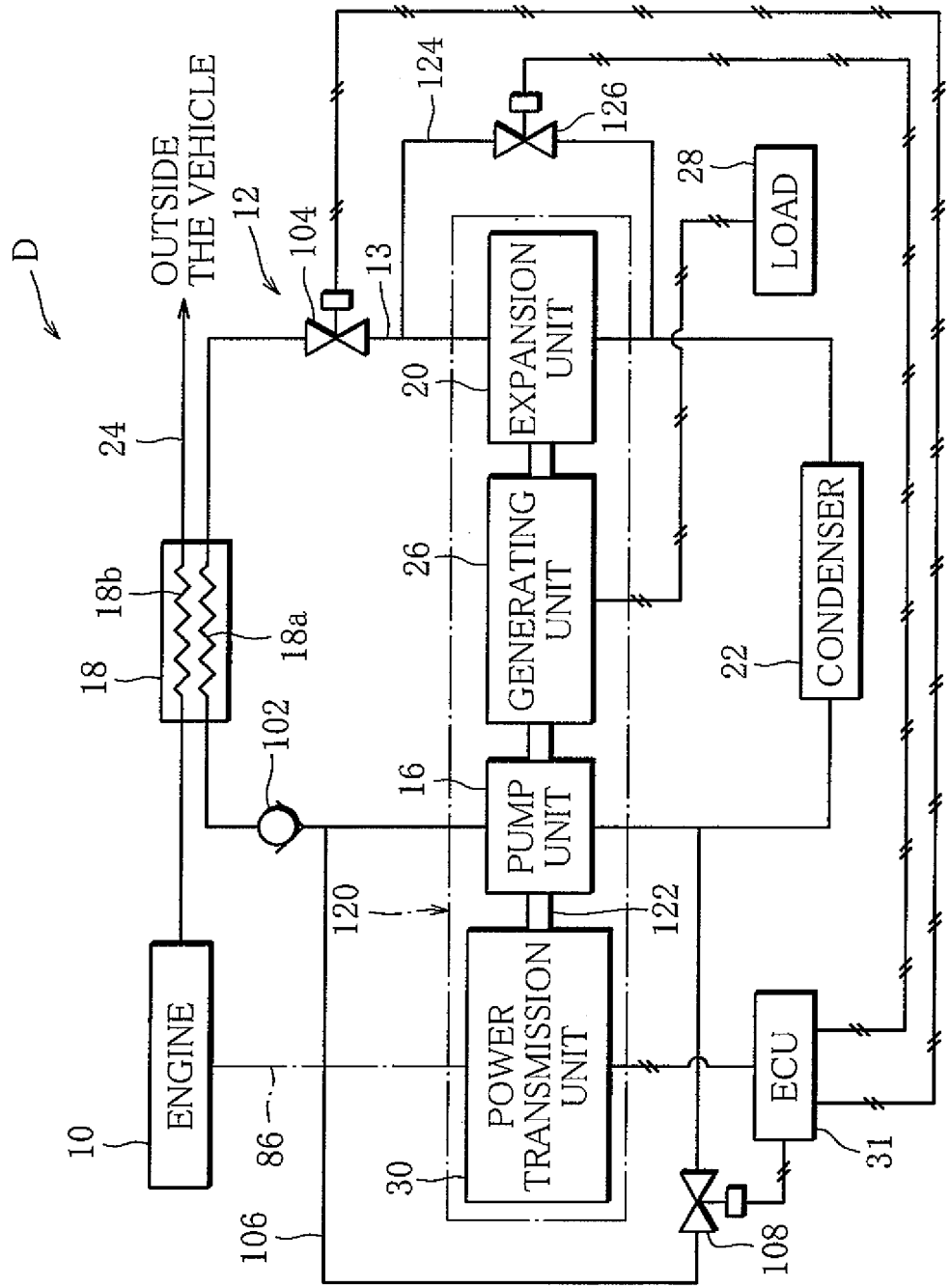
FIG. 5 is a schematic view showing a configuration of a system for utilizing waste heat from a vehicle according to a fourth embodiment.

FIG. 5 is a view showing a schematic configuration of a system D for utilizing waste heat from a vehicle according to a fourth embodiment. Components identical to those of the systems A to C for utilizing waste heat will be provided with the same reference marks, and the explanation thereof will be omitted.

In a fluid machine 120 applied to the system D for utilizing waste heat, the power transmission unit 30, the internal gear 66 of the pump unit 16, the rotor 96 of the generating unit 30, and the shaft 56 of the expansion unit 20 are integrally connected to a single drive shaft 122.

The system D for utilizing waste heat further includes an external return path 124 disposed in the circulation path 13 in parallel with the expansion unit 20, and an electromagnetic valve 126 functioning as a return-path on-off valve, which is interposed in the external return path 124. The electromagnetic valve 126 is capable of opening/closing the external return path 124 in response to signals from the ECU 31.

In the fluid machine 120 of the system D for utilizing waste heat, too, during a period in which the circulation path 13 is closed by the circulation-path on-off valve 104, power is accumulated as pressure energy, and at the same time, the movable scroll 40 of the pump unit 20 makes orbital motion. In the system D for utilizing waste heat, therefore, the external return path 124 is opened by opening the electromagnetic valve 126 when the circulation path 13 is closed by the circulation-path on-off valve 104, to thereby suppress a pressure drop in a section of the circulation path 13, which extends between the circulation-path on-off valve 104 and the expansion unit 20. The expansion unit 20 is thus prevented from operating like a vacuum pump, thereby suppressing the increase of load that is applied from the expansion unit 20 to the drive shaft 122.

After the activation of the fluid machine 120, even if the circulation path 13 is opened by opening the circulation-path on-off valve 104, the expansion unit 20 is bypassed by opening the electromagnetic valve 126 to open the external return path 124 until the pressure of the working fluid within the circulation path 13 is adequately increased. In result, the load that is applied from the expansion unit 20 to the drive shaft 122 is alleviated during a given period after the activation.

If the external return path 124 is closed by closing the electromagnetic valve 126 when the pressure of the working fluid is adequately increased after the activation of the fluid machine 120, the fluid machine 120 is switched to the automatic drive.

The external return path 124 and the electromagnetic valve 126, or alternatively the check valve 102 and the circulation-path on-off valve 104, may be eliminated from the system D for utilizing waste heat.

Figure 6:
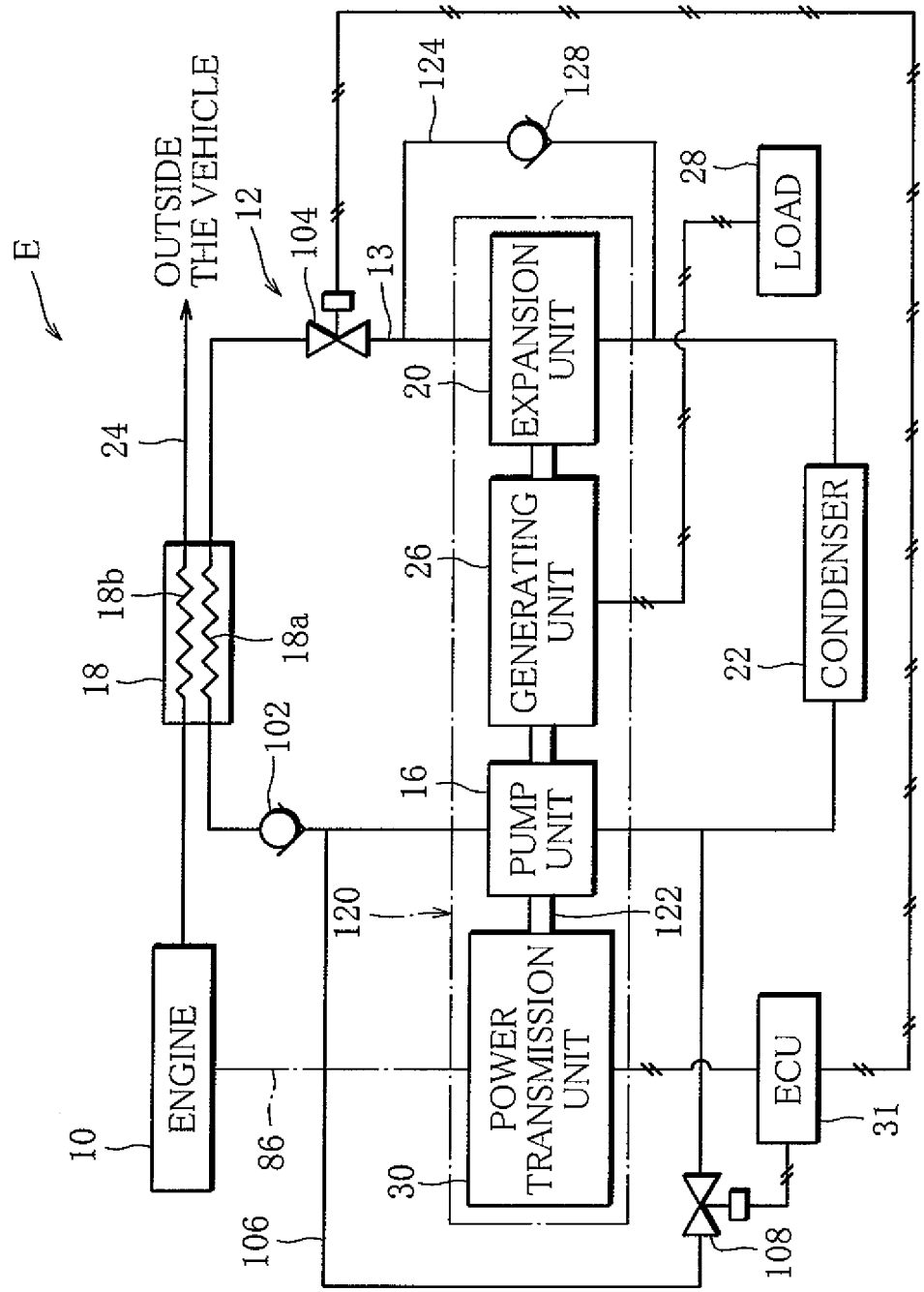
FIG. 6 is a schematic view showing a configuration of a system for utilizing waste heat from a vehicle according to a fifth embodiment.

FIG. 6 shows a schematic configuration of a system E for utilizing waste heat from a vehicle according to a fifth embodiment. Components identical to those of the systems A to D for utilizing waste heat will be provided with the same reference marks, and the explanation thereof will be omitted.

The system E for utilizing waste heat has a non-return valve 128 functioning as a return-path on-off valve. When pressure on the immediate downstream side of the expansion unit 20 becomes lower than pressure on the immediate upstream of the expansion unit 20, the non-return valve 128 allows the working fluid to flow from downstream to upstream. The non-return valve 128 automatically suppresses a pressure drop in the section of the circulation path 13, which extends between the circulation-path on-off valve 104 and the expansion unit 20. Similarly to the electromagnetic valve 126, the non-return valve 128 reduces the load applied from the expansion unit 20 to the drive shaft 122, when accumulating the pressure energy or during a given period after the activation.

In the systems D and E for utilizing waste heat, the external return path 124 and the return-path on-off valve function as means for preventing a pressure drop in the section of the circulation path 13, which extends between the circulation-path on-off valve 104 and the expansion unit 20. However, the pressure-drop preventing means is not limited to them.

Figure 7:
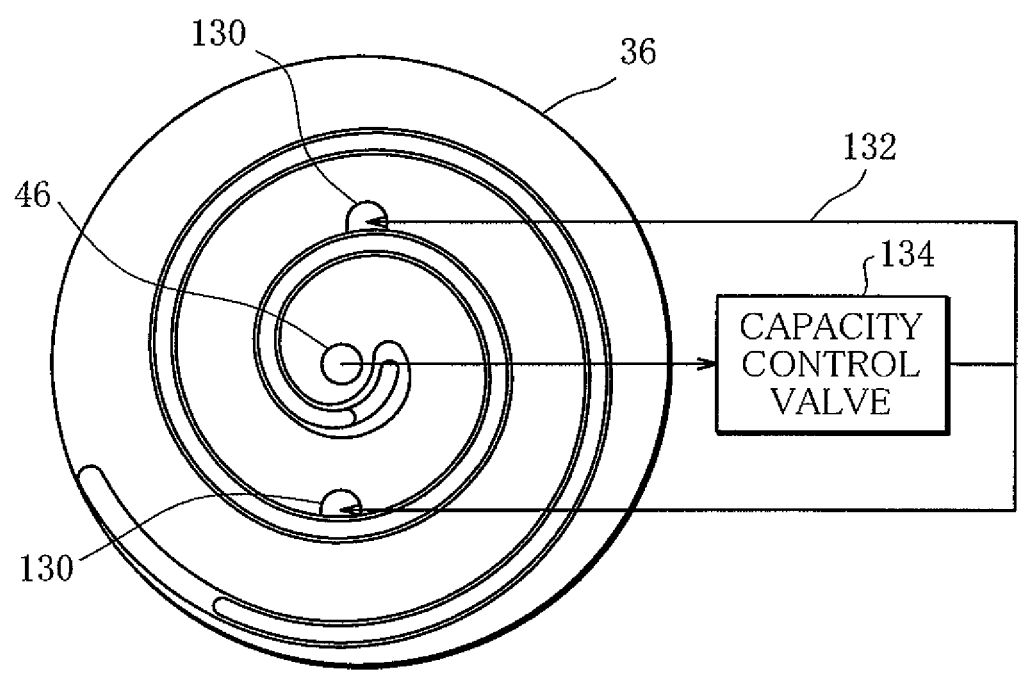
FIG. 7 shows pressure-reduction preventing means according to a modification example.

For example, the pressure-drop preventing means may be capacity variable means of the expansion unit 20. The capacity variable means has a bypass hole 130 that is formed in a base plate of the fixed scroll 36, for example, as shown in FIG. 7. The bypass hole 130 leads to an introduction hole 46 or a high-pressure chamber 38 through an interior channel 132. A capacity control valve 134 is interposed in the interior channel 132. The ECU 31 is capable of controlling the opening/closing of the capacity control valve 134, whereby the capacity of the expansion unit 20 is variable. In this case, if the interior channel 132 is opened by opening the capacity control valve 134, this provides the same advantage as in the case where the return path 124 is opened by opening the return on-off valve. When the capacity variable means is used as the pressure-drop preventing means, the capacity control valve 134 corresponding to a return-path on-off valve may be utilized as a non-return valve.

In the systems B, D and E utilizing waste heat, the external bypass 106 and a bypass on-off valve form the pump bypass means. However, the pump bypass means does not necessarily have to be formed this way.

Figure 8:
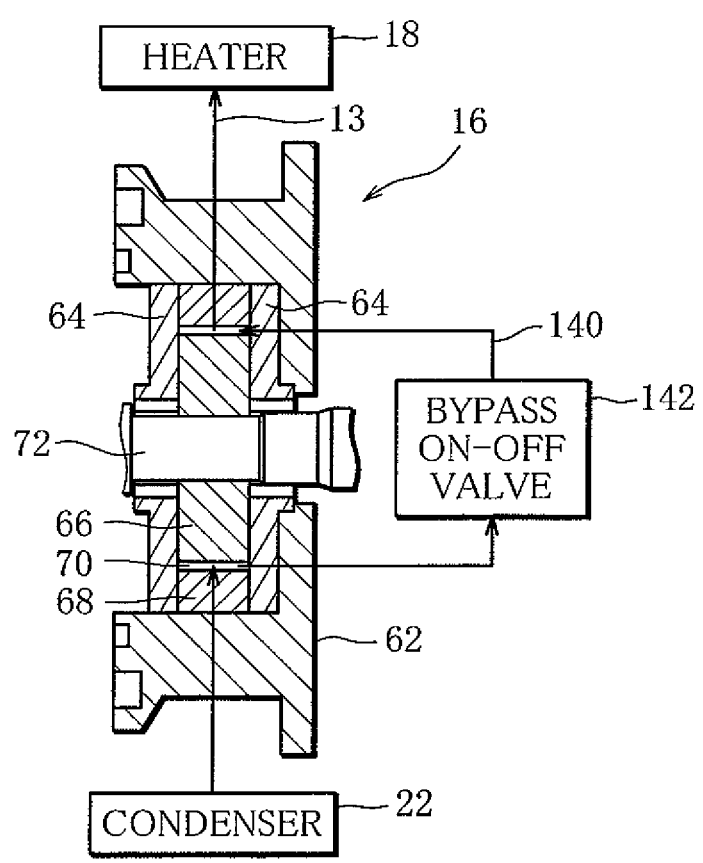
FIG. 8 is a schematic view of a pump unit according to the modification example.

For example, as shown in FIG. 8, it is also possible to provide an internal bypass 140 connecting an upstream pump chamber 70 to a downstream pump chamber 70, and interpose a bypass on-off valve 142 in the internal bypass 140. The opening/closing operation of the bypass on-off valve 142 is controlled by the ECU 31.

In this case, if the ECU 31 opens the bypass on-off valve 142 and thus opens the internal bypass 140, the working fluid being pressurized is discharged. The work of the pump unit 16 is reduced in this manner, and the torque inputted from outside can be used only for power generation in the generating unit 26.

Figure 9:
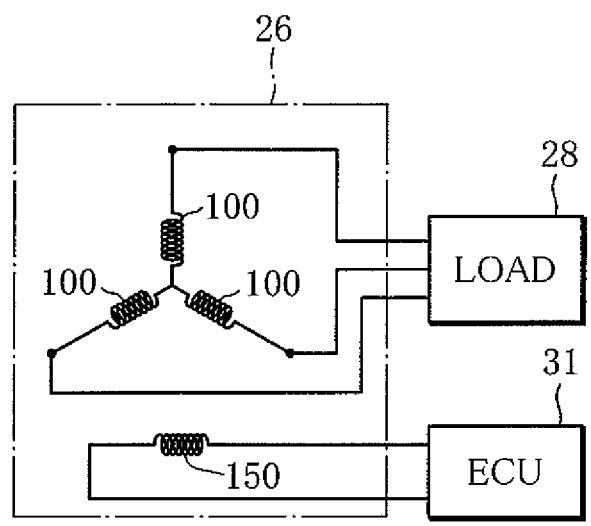
FIG. 9 is a schematic view of a generating unit according to the modification example.

Although the first to fifth embodiments use a permanent magnet as the rotor 96 of the generating unit 26, electromagnet may be utilized. In this case, as shown in FIG. 9, if the amount of current to be supplied to a field coil (motor coil) 150 that is disposed in the rotor is adjusted by the ECU 31, the electric generating capacity can be controlled, and the torque that is consumed in the generating unit 26 becomes adjustable. This makes it possible to properly distribute the external power to the pump unit 16, the generating unit 26 and the expansion unit 20 according to the situation or to properly distribute the torque generated in the expansion unit 20 to the pump unit 16 and the generating unit 26.

Concretely, the electric generating capacity is reduced to suppress a drive torque of the generating unit 26 at the time of activation of the fluid machine 14 or 120, and the electric generating capacity can be increased after the fluid machine 14 or 120 is switched to the automatic drive. When the pressure energy is accumulated, the drive torque of the generating unit 26 can be suppressed by reducing the electric generating capacity. Furthermore, when the vehicle is braked or decelerated, the drive torque of the generating unit 26 may be increased by enlarging the electric generating capacity, to thereby greaten the braking force that is provided to the engine 10.

In the first to fifth embodiments, the pump unit 16 is of a trochoid type, but the pump unit is not particularly limited in type. Although the expansion unit 20 is of a scroll type, the type of the expansion unit is not particularly limited, either. For example, the expansion unit 20 may be of a reciprocating type. In this case, the arrangement of the pump unit 16, the generating unit 26 and the expansion unit 20 is not particularly limited.

The invention claimed is:

1. A fluid machine for constructing a Rankine circuit by being disposed in a circulation path for circulating a working fluid, together with a heater and a condenser, comprising:
   a pump unit that includes a first rotating body, draws in the working fluid along with rotation of the first rotating body, and pressurizes and then discharges the working fluid that has been drawn in;
   an expansion unit that includes a second rotating body, receives the working fluid along with rotation of the second rotating body, and expands and then delivers out the working fluid that has been received;
   a generating unit that includes a third rotating body disposed coaxially with the first and second rotating bodies, and generates electric power along with rotation of the third rotating body;
   a drive shaft that is integrally connected at least to the first rotating body, among the first, second and third rotating bodies; and
   a power transmission unit that is connected to the drive shaft to transmit power from an engine of a vehicle to the drive shaft, wherein the working fluid discharged from the pump unit is heated in the heater by waste heat produced in the vehicle, then expanded in the expansion unit, and then cooled in the condenser.

2. The fluid machine according to claim 1, wherein the power transmission unit is an electromagnetic clutch that intermittently transmits the external power to the drive shaft.

3. The fluid machine according to claim 1, wherein the generating unit generates an alternating current.

4. The fluid machine according to claim 1, wherein the drive shaft is integrally connected to the first, second and third rotating bodies.

5. The fluid machine according to claim 4, wherein the expansion unit has a variable capacity.

6. The fluid machine according to claim 1, wherein the drive shaft is integrally connected to the first and third rotating bodies, whereas the drive shaft and the second rotating body are connected to each other through a connector; and the connector blocks the power transmission between the second rotating body and the drive shaft when rotational frequency of the second rotating body is lower than that of the drive shaft, and allows the power transmission from the second rotating body to the drive shaft when the rotational frequency of the second rotating body is about to get higher than that of the drive shaft.

7. The fluid machine according to claim 1, further having pump bypass means for reducing the work of the pump unit.

8. The fluid machine according to claim 1, wherein the drive shaft is integrally connected to the first rotating body, whereas the drive shaft is connected to the second and third rotating bodies through a connector; and the connector blocks the power transmission between the second and third rotating bodies and the drive shaft when rotational frequencies of the second and third rotating bodies are lower than that of the drive shaft, and allows the power transmission from the second and third rotating bodies to the drive shaft when the rotational frequencies of the second and third rotating bodies are about to get higher than that of the drive shaft.

9. The fluid machine according to claim 4, wherein the generating unit has a field coil, and an electric generating capacity of the generating unit can be varied by adjusting the amount of current applied to the field coil.

10. A Rankine circuit comprising a fluid machine, a heater, and a condenser, which are interposed in a circulation path for circulating a heat medium, wherein the fluid machine including:
a pump unit that includes a first rotating body, draws in a working fluid along with rotation of the first rotating body, and pressurizes and then discharges the working fluid that has been drawn in; an expansion unit that includes a second rotating body, receives the working fluid, and expands and then delivers out the received working fluid along with rotation of the second rotating body;
a generating unit that includes a third rotating body disposed coaxially with the first and second rotating bodies, and generates electric power along with rotation of the third rotating body; a drive shaft that is integrally connected to the first and third rotating bodies; a power transmission unit that is connected to the drive shaft and transmits external power to the drive shaft; and
a connector that connects the drive shaft and the second rotating body to each other, the connector that blocks power transmission between the second rotating body and the drive shaft when a rotational frequency of the second rotating body is lower than that of the drive shaft, and allows power transmission from the second rotating body to the drive shaft when the rotational frequency of the second rotating body is about to get higher than that of the drive shaft.

11. The Rankine circuit according to claim 10, further including:
a check valve that is interposed in a section of the circulation path, which extends between the pump unit of the fluid machine and the heater; and a circulation-path on-off valve that is interposed in a section of the circulation path, which extends between the heater and the expansion unit of the fluid machine.

12. The Rankine circuit according to claim 10, wherein the generating unit has a field coil, and an electric generating capacity of the generating unit can be varied by adjusting the amount of current applied to the field coil.

13. The Rankine circuit according to claim 10, further having pump bypass means for reducing the work of the pump unit.

14. A Rankine circuit comprising a fluid machine, a heater, and a condenser, which are interposed in a circulation path for circulating a heat medium, wherein the fluid machine including:
a pump unit that includes a first rotating body, draws in a working fluid along with rotation of the first rotating body, and pressurizes and then discharges the working fluid that has been drawn in;
an expansion unit that includes a second rotating body, receives the working fluid, and expands and then delivers out the received working fluid along with rotation of the second rotating body;
a generating unit that includes a third rotating body disposed coaxially with the first and second rotating bodies, and generates electric power along with rotation of the third rotating body;
a drive shaft that is integrally connected to the first rotating body; and a power transmission unit that is connected to the drive shaft and transmits external power to the drive shaft; and
a connector that connects the drive shaft to the second and third rotating bodies, the connector blocks the power transmission between the second and third rotating bodies and the drive shaft when rotational frequencies of the second and third rotating bodies are lower than that of the drive shaft, and allows the power transmission from the second and third rotating bodies to the drive shaft when the rotational frequencies of the second and third rotating bodies are about to get higher than that of the drive shaft.

15. The Rankine circuit according to claim 14, further including: a check valve that is interposed in a section of the circulation path, which extends between the pump unit of the fluid machine and the heater; and a circulation-path on-off valve that is interposed in a section of the circulation path, which extends between the heater and the expansion unit of the fluid machine.

16. A Rankine circuit comprising a fluid machine, a heater, and a condenser, which are interposed in a circulation path for circulating a heat medium, wherein the fluid machine including:
a pump unit that includes a first rotating body, draws in a working fluid along with rotation of the first rotating body, and pressurizes and then discharges the working fluid that has been drawn in;
an expansion unit that includes a second rotating body, receives the working fluid, and expands and then delivers out the received working fluid along with rotation of the second rotating body;

a generating unit that includes a third rotating body disposed coaxially with the first and second rotating bodies, and generates electric power along with rotation of the third rotating body;

a drive shaft that is integrally connected to the first, second and third rotating bodies; and a power transmission unit that is connected to the drive shaft and transmits external power to the drive shaft.

17. The Rankine circuit according to claim 16, further including:

a check valve that is interposed in a section of the circulation path, which extends between the pump unit of the fluid machine and the heater; and a circulation-path on-off valve that is interposed in a section of the circulation path, which extends between the heater and the expansion unit of the fluid machine; and a pressure-reduction preventing means prevents a pressure drop in the section of the circulation path, which extends between the circulation-path on-off valve and the expansion unit along with the rotation of the second rotating body when the circulation-path on-off valve is closed.

18. The Rankine circuit according to claim 17, wherein the pressure-reduction preventing means having:

an external return path that is interposed in the circulation path in parallel with the expansion unit; and a return-path on-off valve that opens/closes the external return path.

19. The Rankine circuit according to claim 18, wherein the pressure-reduction preventing means having:

an internal return path that is disposed in the expansion unit of the fluid machine and sends to an upstream side the heat medium that is being expanded or has been expanded; and a return-path on-off valve that opens/closes the internal return path.

20. The Rankine circuit according to claim 18, wherein the return-path on-off path is an electromagnetic valve.

21. The Rankine circuit according to claim 18, wherein the return-path on-off path is a non-return valve.

22. The Rankine circuit according to claim 16, wherein the expansion unit has a variable capacity.

23. The Rankine circuit according to claim 16, wherein the generating unit has a field coil, and an electric generating capacity of the generating unit can be varied by adjusting the amount of current applied to the field coil.

24. The Rankine circuit according to claim 16, further having pump bypass means for reducing the work of the pump unit.

25. A system for utilizing waste heat from a vehicle, comprising a Rankine circuit installed in a vehicle, wherein the Rankine circuit includes a fluid machine, a heater that transfers waste heat generated in an internal combustion engine of the vehicle to a heat medium, and a condenser, which are interposed in a circulation path for circulating the heat medium; and the fluid machine including:

a pump unit that includes a first rotating body, draws in the heat medium along with rotation of the first rotating body, and pressurizes and then discharges the heat medium that has been drawn in; an expansion unit that includes a second rotating body, receives the heat medium, and expands and then delivers out the received heat medium along with rotation of the second rotating body;

a generating unit that includes a third rotating body disposed coaxially with the first and second rotating bodies, and generates electric power along with rotation of the third rotating body;

a drive shaft that is integrally connected to the first and third rotating bodies; and a power transmission unit that is connected to the drive shaft and the internal combustion engine of the vehicle, and transmits power from the internal combustion engine to the drive shaft; and a connector that connects the drive shaft and the second rotating body to each other, the connector that blocks power transmission between the second rotating body and the drive shaft when a rotational frequency of the second rotating body is lower than that of the drive shaft, and allows power transmission from the second rotating body to the drive shaft when the rotational frequency of the second rotating body is about to get higher than that of the drive shaft.

26. A system for utilizing waste heat from a vehicle, comprising a Rankine circuit installed in a vehicle, wherein the Rankine circuit includes a fluid machine, a heater that transfers waste heat generated in an internal combustion engine of the vehicle to a heat medium, and a condenser, which are interposed in a circulation path for circulating the heat medium; and the fluid machine including:

a pump unit that includes a first rotating body, draws in the heat medium along with rotation of the first rotating body, and pressurizes and then discharges the heat medium that has been drawn in; an expansion unit that includes a second rotating body, receives the heat medium, and expands and then delivers out the received heat medium along with rotation of the second rotating body;

a generating unit that includes a third rotating body disposed coaxially with the first and second rotating bodies, and generates electric power along with rotation of the third rotating body; a drive shaft that is integrally connected to the first rotating body; and a power transmission unit that is connected to the drive shaft and the internal combustion engine of the vehicle, and transmits power from the internal combustion engine to the drive shaft; and a connector that connects the drive shaft to the second and third rotating bodies, the connector blocks the power transmission between the second and third rotating bodies and the drive shaft when rotational frequencies of the second and third rotating bodies are lower than that of the drive shaft, and allows the power transmission from the second and third rotating bodies to the drive shaft when the rotational frequencies of the second and third rotating bodies are about to get higher than that of the drive shaft.

27. A system for utilizing waste heat from a vehicle, comprising a Rankine circuit installed in a vehicle, wherein the Rankine circuit includes a fluid machine, a heater that transfers waste heat generated in an internal combustion engine of the vehicle to a heat medium, and a condenser, which are interposed in a circulation path for circulating the heat medium; and the fluid machine including:

a pump unit that includes a first rotating body, draws in the heat medium along with rotation of the first rotating body, and pressurizes and then discharges the heat medium that has been drawn in;

an expansion unit that includes a second rotating body, receives the heat medium, and expands and then delivers out the received heat medium along with rotation of the second rotating body;

a generating unit that includes a third rotating body disposed coaxially with the first and second rotating bodies, and generates electric power along with rotation of the third rotating body;
a drive shaft that is integrally connected to the first, second and third rotating bodies; and
a power transmission unit that is connected to the drive shaft and the internal combustion engine of the vehicle, and transmits power from the internal combustion engine to the drive shaft.

* * * * *